(12) United States Patent
Varga et al.

(10) Patent No.: US 10,054,998 B2
(45) Date of Patent: Aug. 21, 2018

(54) AUTOMATICALLY ENABLED AIRPLANE-MODE PORTABLE POWER SOURCE

(71) Applicant: Carrier Corporation, Farmington, CT (US)

(72) Inventors: Stephen Varga, Waukesha, WI (US); Craig Stephen Blumsack, Boston, MA (US)

(73) Assignee: CARRIER CORPORATION, Farmington, CT (US)

( * ) Notice: Subject to any disclaimer, the term of this patent is extended or adjusted under 35 U.S.C. 154(b) by 64 days.

(21) Appl. No.: 15/146,969

(22) Filed: May 5, 2016

(65) Prior Publication Data
US 2016/0342188 A1 Nov. 24, 2016

Related U.S. Application Data

(60) Provisional application No. 62/163,646, filed on May 19, 2015.

(51) Int. Cl.
*G06F 1/32* (2006.01)
*H04W 4/02* (2018.01)

(52) U.S. Cl.
CPC .......... *G06F 1/3206* (2013.01); *G06F 1/3287* (2013.01); *H04W 4/02* (2013.01); *Y02B 60/50* (2013.01); *Y02D 70/00* (2018.01)

(58) Field of Classification Search
CPC ....... G06F 1/3206; G06F 1/3287; H04W 4/02
See application file for complete search history.

(56) References Cited

U.S. PATENT DOCUMENTS

| | | | |
|---|---|---|---|
| 5,815,407 A * | 9/1998 | Huffman | B64C 27/006 244/183 |
| 6,618,580 B2 * | 9/2003 | Parrott | G06F 1/3203 340/7.33 |
| 7,010,332 B1 | 3/2006 | Irvin et al. | |
| 8,195,108 B2 | 6/2012 | Sheynblat et al. | |
| 8,431,263 B2 | 4/2013 | Shuster | |
| 8,700,931 B2 | 4/2014 | Gudlavenkatasiva et al. | |
| 8,984,307 B2 | 3/2015 | Stewart | |
| 2002/0039896 A1 | 4/2002 | Brown | |
| 2002/0042250 A1 * | 4/2002 | Tamukai | H04M 1/72577 455/69 |
| 2002/0090931 A1 * | 7/2002 | Papineau | H04M 1/72566 455/411 |

(Continued)

FOREIGN PATENT DOCUMENTS

| EP | 1025738 B1 | 11/2002 |
|---|---|---|
| WO | 03019806 A1 | 3/2003 |

(Continued)

*Primary Examiner* — Stefan Stoynov
(74) *Attorney, Agent, or Firm* — Cantor Colburn LLP

(57) ABSTRACT

A portable power device including an enclosure, a plurality of power elements housed within the enclosure, and a controller housed within the enclosure and configured to control the power output of the plurality of power elements. The controller is configured to determine if the portable power device is located on an aircraft that is operating in a stationary, taxiing, or flight mode, and if the aircraft is in the stationary, taxiing, or flight mode, to prevent power to be supplied from the plurality of power elements.

4 Claims, 3 Drawing Sheets

(56) References Cited

U.S. PATENT DOCUMENTS

| | | |
|---|---|---|
| 2005/0093371 A1 | 5/2005 | Zdziech et al. |
| 2006/0006841 A1* | 1/2006 | Lee ..................... H02J 7/0013 |
| | | 320/116 |
| 2007/0037566 A1 | 2/2007 | D'Agostino et al. |
| 2009/0117919 A1* | 5/2009 | Hershenson .......... H04W 48/04 |
| | | 455/456.4 |
| 2010/0279626 A1 | 11/2010 | Bradley et al. |

FOREIGN PATENT DOCUMENTS

| | | |
|---|---|---|
| WO | 2014019296 A1 | 2/2014 |
| WO | 2014161337 A1 | 10/2014 |

\* cited by examiner

AUTOMATICALLY ENABLED AIRPLANE-MODE PORTABLE POWER SOURCE

CROSS-REFERENCE TO RELATED APPLICATIONS

The present application claims priority from U.S. Provisional Patent Application No. 62/163,646, filed May 19, 2015. The contents of the priority application are hereby incorporated by reference in their entirety.

BACKGROUND

The subject matter disclosed herein generally relates to airplane-mode control systems and, more particularly, to systems and methods for automatically enabling an airplane-mode portable power source to shut off power to one or more connected electronic devices.

Federal Aviation Regulations (FAR) Sec 91.21 restricts the use and operation of wireless communication circuitries and other portable electronic devices (PED) aboard aircraft unless it has been previously determined that the specific PED will not cause interference with the navigation or communication system of the aircraft wherein the PED is going to be used. Some PEDs, including those containing intentional radio frequency ("RF") radiators (e.g., radio transmitters), may need to be shut off during taxing and flying on commercial aircraft. Prior solutions for this address disabling of an RF transmitter specifically to meet FAA taxi and flight rules around said transmitters.

Portable electronic devices are prolific and increasingly used outside the proximity of humans. Present devices have the ability to autonomously recognize their presence onboard an operational aircraft such that the transmitting portion of that device could be shut down without human intervention.

SUMMARY

According to one embodiment a portable power device is provided. The device includes an enclosure, a plurality of power elements housed within the enclosure, and a controller housed within the enclosure and configured to control the power output of the plurality of power elements. The controller is configured to determine if the portable power device is located on an aircraft that is operating in a stationary, taxiing, or flight mode, and if the aircraft is in the stationary, taxiing, or flight mode, to prevent power to be supplied from the plurality of power elements.

In addition to one or more of the features described above, or as an alternative, further embodiments may include a switch located within the enclosure and electrically configured between the plurality of power elements and an output of the portable power device.

In addition to one or more of the features described above, or as an alternative, further embodiments may include that the controller is configured to control the switch, and if the aircraft is in the stationary, taxiing, or flight mode, the controller controls the switch to disengage and prevent power output from the plurality of power elements.

In addition to one or more of the features described above, or as an alternative, further embodiments may include that the determination made by the controller is based on at least one of GPS location, RFID tagging or other RF proximity scheme, manual input, Wi-Fi location determination, and Bluetooth.

In addition to one or more of the features described above, or as an alternative, further embodiments may include a first output power line from the plurality of power elements and a second output power line from the plurality of power elements.

In addition to one or more of the features described above, or as an alternative, further embodiments may include a switch electrically configured on the first output power line, the controller configured to control the power output along the first output power line by controlling the switch, and the second output power line configured to continuously supply power even if the controller stops power along the first output power line.

In addition to one or more of the features described above, or as an alternative, further embodiments may include that the plurality of power elements comprise a plurality of at least one of (i) batteries, (ii) power cells, and (iii) piezoelectric generators.

According to another embodiment, a method of controlling power to one or more devices is provided. The method includes monitoring the location of a portable power device having a plurality of power elements, determining that the portable power device is located on an aircraft that is stationary, taxiing, or in-flight, and disabling a power output of the plurality of power elements of the portable power device.

In addition to one or more of the features described above, or as an alternative, further embodiments may include that the disabling comprising switching a switch located between the plurality of power elements and an output of the portable power device.

In addition to one or more of the features described above, or as an alternative, further embodiments may include that the determining comprises one of at least one of GPS locating, RFID or other RF proximity scheme detection, manual input, Wi-Fi location determination, and Bluetooth detection.

In addition to one or more of the features described above, or as an alternative, further embodiments may include that the plurality of power elements comprise a plurality of at least one of (i) batteries, (ii) power cells, and (iii) piezoelectric generators.

Technical effects of embodiments of the present disclosure include devices and methods of automatically turning off the power of a device in certain predetermined areas, such as when on an aircraft, and particularly when taxiing and flying. Further technical effects of embodiments of the present disclosure include providing a power source configured to automatically disable or switch off its output to other electronics during taxiing and/or flying. Further technical effects include a portable power device having a single control circuit configured to control the output of multiple power sources.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
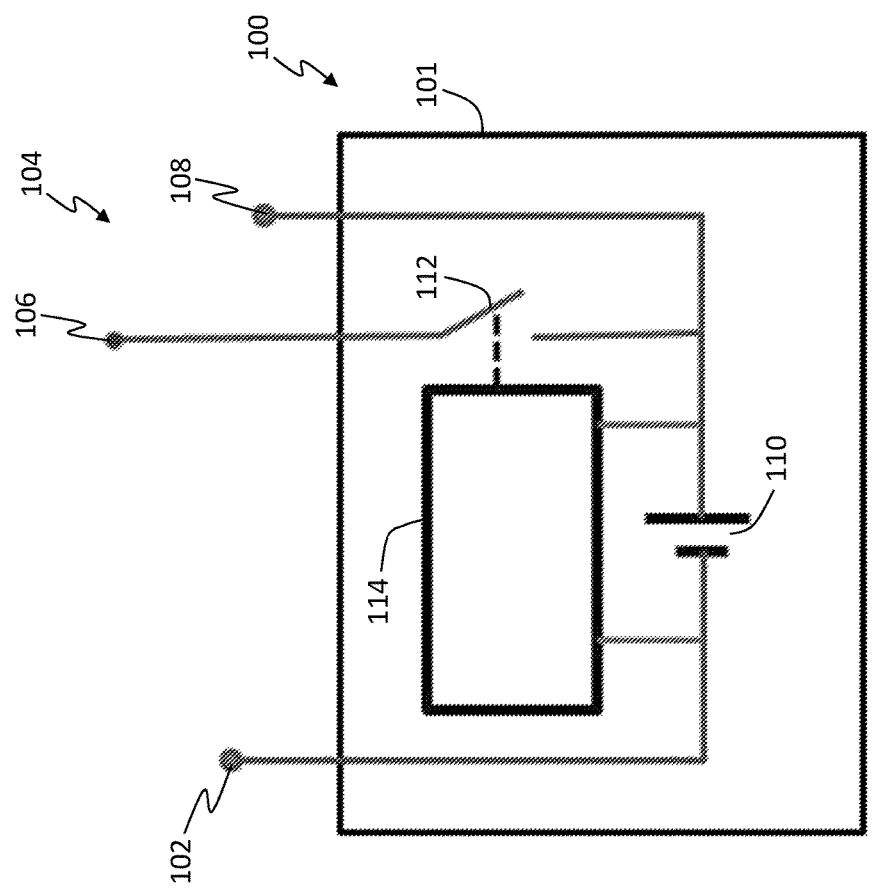
FIG. 1 is a schematic illustration of an embodiment of a portable power device in accordance with the present disclosure.

FIG. 1 is a schematic illustration of a portable power device in accordance with an exemplary embodiment. As shown, a portable power device 100 having an enclosure 101 has a common side 102 and a power side 104. The power side 104 may have a switched power line 106 and an unswitched power line 108. Within the enclosure 101 of the portable power device 100 may be a power source 110, which may be a battery, a plurality of batteries, power cells, piezoelectric generators, or any other power source. The switched power line 106 may have a switch 112 located thereon that is configured to disable a power flow through the switched power line 106. When the switch 112 is disengaged, power cannot be supplied from the portable power device 100 to any connected electronic devices. In contrast, when the switch 112 is engaged, power is supplied to any connected electronic devices electrically connected to power line 106.

The switch 112 is controlled by a control circuit 114 also within the enclosure 101. The control circuit 114 may include an airplane mode sensing circuit and controller. The control circuit 114 is configured to determine the location of the portable power device 100. For example, the control circuit 114 may be configured to use an RFID or other similar near field technology to determine that the portable power device 100 is in a location or environment where the power must be controlled. For example, in the aerospace industry it may be possible to determine using the control circuit 114 that the portable power device 100 is on an aircraft and that the aircraft is taxiing or in flight. This determination technique is known, and in various embodiments the control circuit 114 may be configured with one or more of the many different techniques and associated hardware and software.

The control circuit 114 may also be automatic, in some embodiments. That is, the control circuit 114 may continuously operate with power supplied from the power source 110, such that the control circuit 114, and any sensors, control elements, processors, memory, software, etc. may be operated at any and/or all times. As such, because the control circuit 114, and thus the portable power device 100, is autonomous, the operation and processes described herein may be performed without a user required to interact with the portable power device or any of the electronics that may be powered thereby. In other embodiments, the enclosure 101 may include a selector switch that may be configured to activate and/or deactivate the auto-airplane mode operation described herein.

The control circuit 114 is configured to control the power output of the power source 110, which is a plurality of elements, such as cells, batteries, piezoelectric generators, etc., and/or combinations thereof. That is, a single control circuit 114 is configured to control the power output of multiple elements. The multiple elements are configured such that power may be supplied to multiple electronic devices that may be connected to the portable power device 100, to either switched power line 106 or unswitched power line 108.

In operation, if the control circuit 114 determines that the power must be controlled, e.g., turned off for devices connected to the switched power line 106, then the control circuit 114 may cause or instruct the switch 112 to open or disengage. By opening or disengaging the switch 112 the power supplied along the switch power line 106 may be turned off or stopped. As will be appreciated by those of skill in the art, the control between the control circuit 114 and the switch 112 may be electrical, electronic, mechanical, or may have other configurations without departing from the scope of the disclosure. For example, when the control circuit 114 determines that the portable power device 100 is located on an aircraft that is in a mode of operation that includes taxiing and/or flight, the control circuit 114 may be configured to send an electrical command to the switch 112 to disengage and cease supplying power along the switched power line 106.

When it is determined by the control circuit 114 that the portable power device 100 is no longer on an aircraft that is currently taxiing and/or in-flight, the control circuit 114 is configured to send a command to the switch 112 to re-engage or close. When the switch 112 is closed or engaged, power is supplied along the switched power line 106 and to any devices connected thereto.

As noted, when the switch 112 is open, the switched power line 106 does not supply power to any connected device(s). However, in the embodiment shown in FIG. 1, even when the switch 112 is open or disengaged, the unswitched power line 108 of the portable power device 100 may be configured to continue to supply power to electronic device(s) connected to the unswitched power line 108.

Thus, the portable power device 100 may have at least two states, with a first state being full supplied power along both the switched power line 106 and the unswitched power line 108, and the second state being a condition in which the switched power line 106 is disabled and does not supply power to any connected electronic devices, while power is still supplied along the unswitched power line 108.

Figure 2:
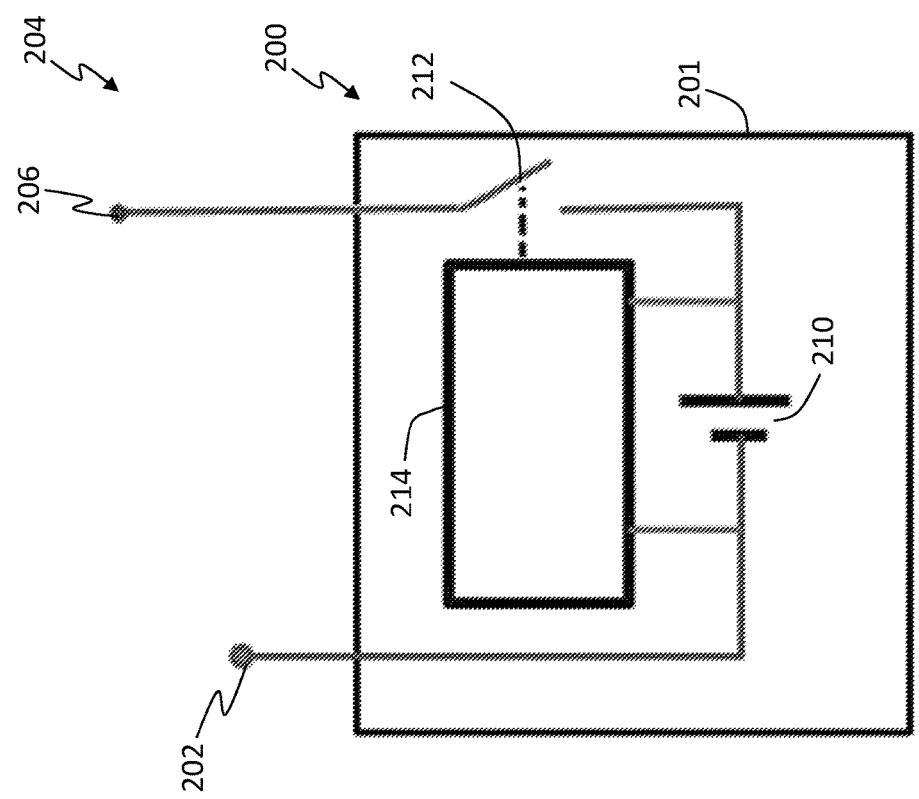
FIG. 2 is a schematic illustration of another embodiment of a portable power device in accordance with the present disclosure.

Turning now to FIG. 2, an alternative embodiment is shown. In this embodiment, the unswitched power line shown in FIG. 1 is eliminated, and only a switched power line is present within the portable power device. That is, a portable power device 200 includes a common side power line 202 and a power side 204 that is switched, with a switched power line 206. Housed within an enclosure 201 of the portable power device 200 is a power source 210 that connects the common side 202 with the power side 204. As described above, the power source 210 may be configured as a plurality of elements that are controlled, in part, by a control circuit 214.

The control circuit 214 is configured to operationally control a switch 212 that is configured to disable a power supply from the power source 210 of the portable power device 200. In this embodiment, the portable power device 200 is configured to provide power or not provided power, and thus, any connected device will be disabled or powered off when the switch 212 is opened or disengaged. Thus, a single power device, i.e., portable power device 200, may be able to control the power supply to multiple electronic devices, and disable power thereto when a particular situation is detected. For example, if the control circuit 214 of the portable power device 200 detects that the portable power device 200 is located on an aircraft and the aircraft is taxiing and/or in-flight, the control circuit 214 may send a command to the switch 212 to disengage or open, thus preventing power to be supplied to any devices connected to the portable power device 200.

Figure 3:
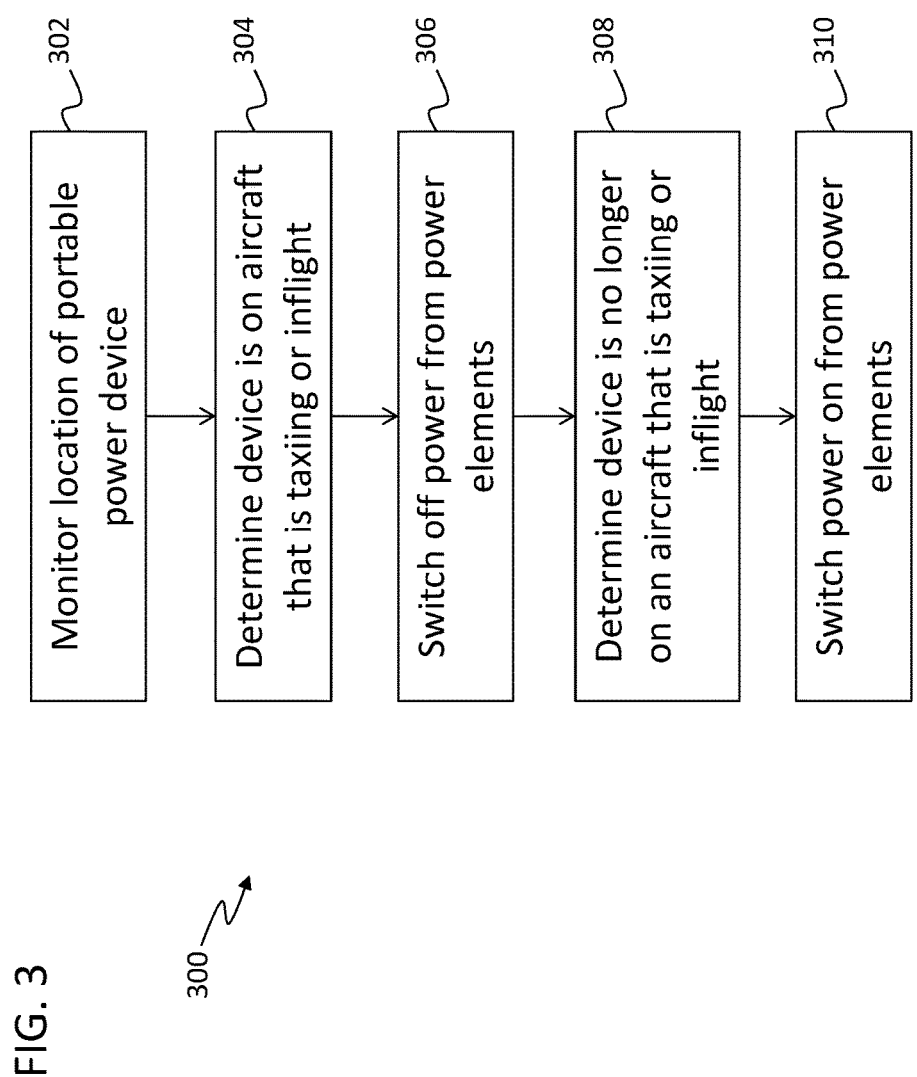
FIG. 3 is a process of controlling power output in a portable power device in accordance with the present disclosure.

Turning now to FIG. 3, a process in accordance with an embodiment of the disclosure is shown. The process may be performed with a portable power device, as described above with respect to FIG. 1 or 2, or other similar devices that include multiple power elements with a single controller. At step 302, the portable power device may monitor the location of the portable power device. This may include a controller or other similar circuitry and electronics. The monitoring may be determined based on GPS location, RFID tagging or other RF proximity scheme, manual input, Wi-Fi location determination, Bluetooth, and/or other means of passively identifying co-location on a plane that may be stationary, taxiing, or in flight.

At step 304, a determination is made that the portable power device is located on an aircraft and that the aircraft is in a mode of operation that is taxiing and/or in-flight. This step indicates that any electronics that are powered by the portable power device should be powered off.

Thus, at step 306, a switch is disengaged, thus stopping the power supply from the multiple power elements of the portable power device to the electronic devices connected thereto.

At step 308, if it is determined that the aircraft is no longer in-flight and/or no longer taxiing, the controller of the portable power device may re-engage the switch at step 310. Thus power may be supplied from the multiple power elements of the portable power device to the electronic devices connected thereto. Thus, power may be controlled and supplied to various or multiple electronic devices at appropriate times and power can be turned off when needed or required, automatically.

In some embodiments, the power controller of the portable power device is an autonomous portable power source assembly consisting of multiple power elements, such as batteries, cells, etc., which has the capability to automatically disable (switch off) its output during taxiing and/or flying (airplane-mode operation) and is therefore not specific to disabling an RF transmitter alone. Advantageously, in this way, embodiments of the present disclosure have the potential to be stand-alone products and/or devices that are not required to be intrinsic to the electronics requiring disablement. In some embodiments, a switched power line can be directed to areas of a device that require shut down during flight and an un-switched power line can be directed to areas that may remain active during flight.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A portable power device comprising:
   an enclosure having a common side and a power side, wherein the power side includes a switched power line and an unswitched power line, wherein the switched power line is connected to at least one first connected electronic device and the unswitched power line is connected to at least one second connected electronic device;
   a plurality of power elements housed within the enclosure arranged to supply power through the switched power line and the unswitched power line; and
   a controller housed within the enclosure and configured to control the power output of the plurality of power elements through at least the switched power line,
   wherein the controller is configured to (i) determine if the portable power device is located on an aircraft that is operating in a stationary, taxiing, or flight mode, and when the controller determines the aircraft is in the stationary, taxiing, or flight mode, the controller controls the switched power line to prevent power to be supplied from the plurality of power elements to the at least one first connected electronic device,
   wherein the determination made by the controller is based on at least one of GPS location, RFID tagging or other RF proximity scheme, Wi-Fi location determination, and Bluetooth.

2. The portable power device of claim 1, wherein the plurality of power elements comprise a plurality of at least one of (i) batteries, (ii) power cells, and (iii) piezoelectric generators.

3. A method of controlling power to one or more devices, the method comprising:
   monitoring the location of a portable power device having a plurality of power elements, wherein the portable power device includes an enclosure having a common side and a power side, wherein the power side includes a switched power line and an unswitched power line, wherein the switched power line is connected to at least one first connected electronic device and the unswitched power line is connected to at least one second connected electronic device;
   determining that the portable power device is located on an aircraft that is stationary, taxiing, or in-flight; and
   disabling a power output of the plurality of power elements of the portable power device to the at least one second connected electronic device by controlling the switched power line,
   wherein the determining comprises at least one of GPS locating, RFID or other RF proximity scheme detection, Wi-Fi location determination, and Bluetooth detection.

4. The method of claim 3, wherein the plurality of power elements comprise a plurality of at least one of (i) batteries, (ii) power cells, and (iii) piezoelectric generators.

* * * * *